United States Patent Office 3,705,153
Patented Dec. 5, 1972

3,705,153
NOVEL THIAZOLYACETIC ACIDS AND
SALTS THEREOF
Shin-Ichi Kaneko, Nishinomiya, Kei Takahashi, Takatsuki, and Hisao Yamamoto, Nishinomiya, Japan, assignors to Sumitomo Chemical Company, Ltd., Osaka, Japan
No Drawing. Filed May 4, 1970, Ser. No. 34,567
Claims priority, application Japan, May 14, 1969, 44/37,205; May 15, 1969, 44/37,825; May 31, 1969, 44/42,695, 44/42,696, 44/42,699; June 2, 1969, 44/43,405; July 8, 1969, 44/54,307; July 10, 1969, 44/54,889; Nov. 14, 1969, 44/91,616
Int. Cl. C07d 91/32
U.S. Cl. 260—240 D     3 Claims

ABSTRACT OF THE DISCLOSURE

Novel thiazolylacetic acid derivatives of the formula,

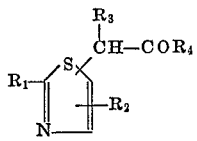

wherein $R_1$ is pyridyl, unsubstituted or halogen-, alkyl-, alkoxy-, phenyl- or halophenyl-substituted indolyl, unsubstituted or halogen-, nitro-, methylenedioxy-, alkyl- or alkoxy-substituted styryl; $R_2$ is hydrogen, alkyl or unsubstituted or substituted phenyl; $R_3$ is hydrogen or alkyl; and $R_4$ is hydroxyl, alkoxy, amino or hydrazino; and salts thereof which are useful for anti-inflammatory agents.

These thiazolylacetic acid derivatives are produced by contacting a thioamide derivative of the formula,

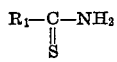

wherein $R_1$ has the same meaning as defined above, with a halogenated compound of the formula,

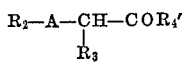

wherein $R_2$ and $R_3$ have the same meanings as defined above; $R_4'$ is the same alkoxy as in the definition of $R_4$; and A is a group of the formula,

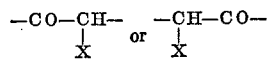

wherein X is halogen, to yield an alkyl thiazolylacetate derivative of the formula,

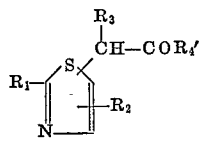

wherein $R_1$, $R_2$, $R_3$ and $R_4'$ have the same meanings as defined above, and further, if necessary, contacting the resultant alkyl thiazolylacetate derivative with a compound of the formula,

wherein $R_4''$ is hydroxyl, amino or hydrazino, to yield a thiazolylacetic acid derivative of the formula,

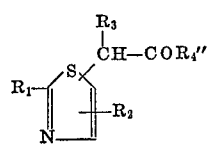

wherein $R_1$, $R_2$, $R_3$ and $R_4''$ have the same meanings as defined above.

The present invention relates to novel thiazolylacetic acid derivatives and salts thereof which are useful for medicines. More particularly, the present invention pertains to novel thiazolylacetic acid derivatives of the formula,

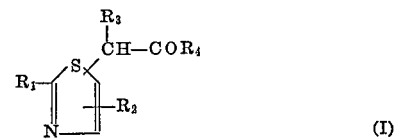

wherein $R_1$ is pyridyl, indolyl which may be unsubstituted or substituted with one or more members selected from the group consisting of halogen, $C^1$-$C^5$ alkoxy, $C^1$-$C^5$ alkyl, phenyl and halophenyl, styryl which may be unsubstituted or substituted in the benzene ring with one or more members selected from the group consisting of halogen, nitro, methylenedioxy, $C^1$-$C^5$ alkyl and $C^1$-$C^5$ alkoxy; $R_2$ is hydrogen, $C^1$-$C^5$ alkyl or unsubstituted or substituted phenyl; $R_3$ is hydrogen or $C^1$-$C^5$ alkyl; and $R_4$ is hydroxyl, $C^1$-$C^5$ alkoxy, amino or hydrazino, and salts thereof, a process for their production and their pharmaceutical use.

The present inventors found that novel thiazolylacetic acid derivatives of the Formula I and salts thereof have prominent anti-inflammatory activities and are very useful for medicines.

Accordingly one object of the present invention is to provide such novel and useful thiazolylacetic acid derivatives and salts thereof. Another object of the present invention is to provide a process for producing the same. A further object is to provide pharmaceutical composition containing the same. Other objects and merits of the present invention will be apparent from the description as follows.

In order to accomplish these objects, the present invention provides novel thiazolylacetic acid derivatives of the Formula I and salts thereof.

The present invention further provides a process for producing novel thiazolylacetic acid derivatives of the Formula I and salts thereof, which comprises contacting a thioamide derivative of the formula,

wherein $R_1$ has the same meanings as defined above, with a halogenated compound of the formula,

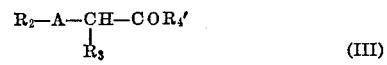

wherein $R_2$ and $R_3$ have the same meanings as defined above; $R_4'$ is the same alkoxy as in the definition of $R_4$; and A is a group of the formula,

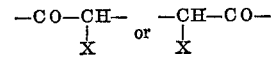

wherein X is halogen, to yield an alkyl thiazolylacetate derivative of the formula,

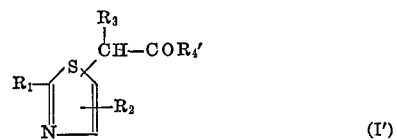

wherein $R_1$, $R_2$, $R_3$ and $R_4'$ have the same meanings as defined above and further, if necessary, contacting the resulting alkyl thiazolylacetate derivative of the Formula I′ or salt thereof with a compound of the formula, $$R_4''-H \quad (IV)$$

wherein $R_4''$ is hydroxyl, amino or hydrazino, to yield a thiazolylacetic acid derivative of the formula,

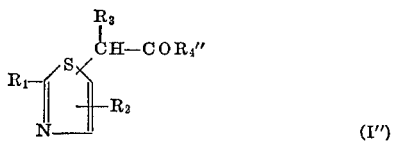

(I′′)

wherein $R_1$, $R_2$, $R_3$ and $R_4''$ have the same meanings as defined above.

The present invention provides furthermore pharmaceutical composition consisting of an effective amount of thiazolylacetic acid derivative of the Formula I and pharmaceutically acceptable carrier.

According to the present invention, the reaction of the thioamide derivative of the Formula II with a halogenated compound of the Formula III is carried out at a temperature of 20°–100° C. in the presence or absence of an inert solvent. In some cases, it is preferable to heat the reaction mixture. Examples of the inert solvent include methanol, ethanol, acetone, tetrahydrofuran and dioxane. Employment of ethanol provides the most preferable result. Preferable examples of halogen of X of the halogenated compound of the Formula III include chlorine and bromine.

In the process of the present invention, it is possible to convert the resultant alkyl thiazolylacetate derivative of the Formula I′ into a corresponding free acid, amide or hydrazide derivative. That is, reaction of the alkyl thiazolylacetate derivative of the Formula I′ with a compound of the Formula IV yields a thiazolylacetic acid derivative of the Formula I′′.

The reaction is carried out in the presence or absence of a suitable solvent such as water, methanol, ethanol, tetrahydrofuran or dioxane, etc.

In case $R_4''$ is hydroxyl, it is preferable to carry out the reaction in the presence of a basic agent, preferable examples of which include alkali metal hydroxides such as sodium hydroxide or potassium hydroxide.

In case $R_4''$ is amino or hydrazino, the reaction is carried out in the presence of ammonia or hydrazine compound. Heating the reaction mixture at a temperature of 40°–100° C. results in acceleration of the reaction rate and completion of the reaction. It is most preferable to use a concentrated ammonium hydroxide solution or a concentrated hydrazine hydrate solution.

Further according to the process of the present invention, acid addition salts of the thiazolylacetic acid derivatives of the Formula I can be obtained by contacting the thiazolylacetic acid derivative of the Formula I with hydrochloric acid, hydrobromic acid, maleic, acid, tartaric acid or succinic acid in a suitable solvent such as, for example, methanol, ethanol, isopropylalcohol, ether, benzene, tetrahydrofuran, dioxane or the like.

According to the process of the present invention, there are produced such thiazolylacetic acid derivatives and salts thereof as shown below.

2-(2′-pyridyl)thiazol-4-ylacetic acid
α-[2-(2′-pyridyl)thiazol-4-yl]-propionic acid
α-[2-(2′-pyridyl)thiazol-4-yl]-butylic acid
2-(2′-pyridyl)-4-methyl-thiazol-5-ylacetic acid
α-[2-(2′-pyridyl)-4-methyl-thiazol-5-yl]-propionic acid
α-[2-(2′-pyridyl)-4-methyl-thiazol-5-yl]-butylic acid
2-[3′-(o-fluorophenyl)-5′-chloro-indol-2′-yl]-thiazol-4-yl-acetic acid
2-[3′-(o-fluorophenyl)-5′-chloro-indol-2′-yl]-thiazol-4-yl-α-methylacetic acid
2-[3′-(o-fluorophenyl)-5′-chloro-indol-2′-yl]-thiazol-4-yl-α-ethylacetic acid
2-[3′-(o-fluorophenyl)-5′-chloro-indol-2′-yl]-thiazol-4-yl-α-butylacetic acid
2-[1′-(β-diethylaminoethyl)-3′-(o-fluorophenyl)-5′-chloro-indol-2′yl]-thiazol-4-ylacetic acid
2-[1′-(β-diethylaminoethyl)-3′-(o-fluorophenyl)-5′-chloro-indol-2′-yl]-thiazol-4-yl-α-methylacetic acid
2-[1′-(β-diethylaminoethyl)-3′-(o-fluorophenyl)-5′-chloro-indo-2′-yl]-thiazol-4-yl-α-ethylacetic acid
2-[3′-(o-chlorophenyl)-5′-chloroindol-2′-yl]-thiazol-4-yl-acetic acid
2-[3′-(o-chlorophenyl)-5′-chloroindol-2′-yl]-thiazol-4-yl-α-methylacetic acid
2-(3′-methyl-5′-chloroindol-2′-yl)-thiazol-4-ylacetic acid
2-(3′-methyl-5′-chloroindol-2′-yl)-thiazol-4-yl-α-methylacetic acid
2-(3′-methyl-5′-chloroindol-2′-yl)-thiazol-4-yl-α-ethylacetic acid
2-(3′-phenyl-5′-nitroindol-2′-yl)-thiazol-4-ylacetic acid
2-(3′-phenyl-5′-nitroindol-2′-yl)thiazol-4-yl-α-methylacetic acid
2-(3′-phenyl-5′-nitroindol-2′-yl)-thiazol-4-yl-α-ethylacetic acid
2-(3′-ethyl-5′-chlorindo-2-yl)-thiazol-4-ylacetic acid
2-(3′-ethyl-5′-chloroindol-2-yl)-thiazol-4-yl)-α-methylacetic acid
2-(3′-ethyl-5′-chloroindol-2-yl)-thiazol-4-yl-α-ethylacetic acid
2-(3′-methyl-5′-methoxyindol-2-yl)-thiazol-4-ylacetic acid
2-(3′-methyl-5′-methoxyindol-2-yl)thiazol-4-yl-α-methylacetic acid
2-(3′-methyl-5′-methoxyindol-2-yl)-thiazo-4-yl-α-butylacetic acid
2-(3′,5′-dimethylindol-2′-yl)-thiazol-4-ylacetic acid
2-(3′,5′-dimethylindol-2′-yl)-thiazol-4-yl-α-methylacetic acid
2-(3′,5′-dimethylindol-2′-yl)-thiazol-4-yl-α-ethylacetic acid
2-(5′-chloroindol-2′-yl)-thiazol-4-ylacetic acid
2-(5′-chloroindol-2′-yl)-thiazol-4-yl-α-methylacetic acid
2-(3′,5′-dimethylindol-2′-yl)-5-ethylthiazol-4-ylacetic acid
2-(3′,5′-diethylindol-2′-yl)-thiazol-4-ylacetic acid
2-(3′,5′-dimethylindol-2′-yl)-5-methylthiazol-4-ylacetic acid
2-[3′-(o-fluorophenyl)-5′-chloroindol-2′-yl]-4-methylthiazol-5-ylacetic acid
2-[3′-(o-fluorophenyl)-5′-chloroindol-2′-yl]-4-phenyl-thiazol-5-ylacetic acid
2-[3′-(o-fluorophenyl)-5′-chloroindol-2′-yl]-4-methyl-thiazol-5-yl-α-methylacetic acid
2-[3′-(β-diethylaminoethyl)-3′-(o-fluorophenyl)-5′-chloroindol-2′-yl]-4-methylthiazol-5-ylacetic acid
2-[3′-(β-diethylaminoethyl)-3′-(o-fluorophenyl)-5′-chloroindol-2′-yl]-4-phenylthiazol-5-ylacetic acid
2-[3′-(o-chlorophenyl)-5′-chloroindol-2′-yl]-4-methylthiazol-5-ylacetic acid
2-[3′-(o-chlorophenyl)-5′-chloroindol-2′-yl]-4-(p-chlorophenyl)-thiazol-5-ylacetic acid
2-(3′-methyl-5′-chloroindol-2′-yl)-4-methylthiazol-5-ylacetic acid
2-(3′-methyl-5′-chloroindol-2′-yl)-4-phenylthiazol-5-ylacetic acid
2-(3′-methyl-5′-chloroindol-2′-yl)-4-(p-chlorophenyl)-thiazol-5-ylacetic acid
2-(3′-phenyl-5′-nitroindol-2′-yl)-4-methylthiazol-5-ylacetic acid
2-(3′-phenyl-5′-nitroindol-2′-yl)-4-phenylthiazol-5-ylacetic acid
2-(3′-ethyl-5′-chloroindol-2-yl)-4-methylthiazol-5-ylacetic acid
2-(3′-ethyl-5′-chloroindol-2′-yl)-4-(p-chlorophenyl)-thiazol-5-ylacetic acid
2-(3′-methyl-5′-methoxyindol-2′-yl)-4-methylthiazol-5-ylacetic acid 2-(3'-methyl-5'-methoxyindol-2'-yl)-4-phenylthiazol-5-ylacetic acid pyrazolidine (phenylbutazone) are given in the following table.

TABLE

| Compound | Effects | | |
|---|---|---|---|
| | 50% inhibiting dose of carrageenin edema of rat's hind paw, per os (mg./kg.) | 50% lethal dose of rat, per os (mg./kg.) | Therapeutic ratio 50% lethal dose (50% inhibiting dose of carrageenin edema) |
| 1,2-diphenyl-3,5-dioxo-4-n-butyl-pyrazolidine (phenylbutazone) | 320 | ca 600 | ca 1.9 |
| 2-(3'-pyridyl)-4-methylthiazol-5-ylacetamide | 410 | >1,500 | >3.7 |
| Ethyl 2-styryl-4-methylthiazol-5-ylacetate | 400 | >1,500 | >3.8 |
| 2-styryl-4-methylthiazol-5-ylacetic acid | 230 | >1,500 | >6.5 |
| 2-(p-chlorostyryl)-4-methylthiazol-5-ylacetic acid | 225 | >1,500 | >6.7 |
| 2-(p-chlorostyryl)-thiazol-4-ylacetic acid hydrazide | 410 | >1,500 | >3.7 |
| Ethyl 2-(p-methylstyryl)-4-methylthiazol-5-ylacetate | 220 | >1,500 | >6.8 |
| 2-(p-chlorostyryl)-4-methylthiazol-5-ylacetic acid | 250 | >1,500 | >6.0 |
| 2-(p-methoxystyryl)-4-thiazol-acetamide | 450 | >1,500 | >3.3 |
| Ethyl 2-(1'-methyl-3'-phenyl-5'-chloroindol-2'-yl)-4-thiazolacetate | 410 | >1,500 | >3.7 |

2-(3',5'-diethyl-indol-2'-yl)-4-methylthiazol-5-ylacetic acid
2-(3',5'-dimethyl-indol-2'-yl)-4-phenylthiazol-5-ylacetic acid
2-(5'-chloro-indol-2'-yl)-4-methylthiazol-5-ylacetic acid
2-(5'-chloroindol-2'-yl)-4-methylthiazol-5-yl-α-methylacetic acid
2-(4'-chlorostyryl)-thiazol-4-yl-α-methylacetic acid
2-(4'-chlorostyryl)-4-ethylthiazol-5-ylacetic acid
2-(4'-chlorostyryl)-4-methylthiazol-5-yl-α-methylacetic acid
2-(4'-methoxystyryl)-thiazol-4-yl-α-methylacetic acid
2-(4'-methoxystyryl)-thiazol-4-yl-α-ethylacetic acid
2-(4'-methoxystyryl)-4-methylthiazol-5-yl-α-methylacetic acid
2-(4'-methoxystyryl)-4-ethylthiazol-5-ylacetic acid
2-(2'-methylstyryl)-4-methylthiazol-5-ylacetic acid
2-(2'-chlorostyryl)-4-methylthiazol-5-ylacetic acid
2-(2'-chlorostyryl)-thiazol-4-ylacetic acid
2-(2'-methylstyryl)-thiazol-4-ylacetic acid
2-(2'-methoxystyryl)-thiazol-4-ylacetic acid
2-(2'-methoxy-α-methylstyryl)-thiazol-4-ylacetic acid
2-(2'-chlorostyryl-α-methylstyryl)-thiazol-4-ylacetic acid
2-(2'-chlorostyryl)-thiazol-4-yl-α-methylacetic acid
2-(2'-chloro-α-methylstyryl)-5-methylthiazol-4-ylacetic acid
2-(3'-chlorostyryl)-thiazol-4-ylacetic acid
2-(3'-chlorostyryl)-4-methylthiazol-5-ylacetic acid
2-(3'-chlorostyryl)-thiazol-4-yl-α-methylacetic acid and their methyl, ethyl, isopropyl, propyl, butyl, isobutyl, or amyl ester, and their amide, or hydrazide, and their hydrochlorides, hydrobromides, maleates, tartarates, or succinates.

Among these novel thiazolylacetic acid derivatives and their salts of the present invention, there are useful compounds, which indicate not only excellent anti-inflammatory action but also possess comparatively low toxicity. The many compounds of this invention are low in toxicity, and even when over 200 mg./kg. of these compounds are orally administered to each of rat and mouse, they scarcely show toxic symptoms and occult bleeding is negative in feces thereof. Nevertheless, the activities of these compounds are much higher than those of 1,2-diphenyl - 3,5 - dioxo - 4 - n - butylpyrazolidine (phenylbutazone) and oxyphenbutazone. Therefore, the therapeutic ratios of the compounds of the present invention are far greater than any other drugs. Therefore, these compounds are markedly valuable in practical use.

The therapeutic ratios of some compounds of the present invention, and 1,2-diphenyl - 3,5 - dioxo-4-n-butyl- The present inventors prepared many other thiazolylacetic acid derivatives than the compounds shown in the aforesaid table and evaluated the pharmaceutical effects thereof by animal tests.

The present inventors have found that many thiazolylacetic acid derivatives of the Formula I, which are prepared by the present invention, are superior to 1,2-diphenyl-3,5-dioxo - 4 - n - butylpyrazolidine (phenylbutazone) in the thereapeutic ratios thereof and have a great practical value.

It has found that these compounds also have comparatively potent analgesic activities shown by Haffner's method, and antipyretic activities in a pyrogen test.

This invention is further disclosed in the following examples of preferred embodiments thereof, which are presented for purposes of illustration and are not intended to limit the scope of the invention.

EXAMPLE 1

A mixture of 4-pyridylthioamide (25 g.) and β-bromoethyl levulinate (44 g.) in 250 ml. of ethanol was heated with stirring at 50°–60° C. for 10 hrs. After cooling, the yellow crystals produced were collected by filtration and recrystallized from ethanol to give 7 g. of ethyl 2-(4'-pyridyl)-4-methyl-thiazol-5-ylacetate hydrobromide, M.P. 206°–208° C.

EXAMPLE 2

A mixture of 4-pyridylthioamide (14 g.) and ethyl γ-bromoethylacetacetate (40 g.) in 150 ml. of ethanol was stirred at room temperature for 3 hrs. and then heated at 50° C. for 5 hrs. After cooling, the yellow crystals produced were collected by filtration and recrysallized from ethanol to give 15 g. of ethyl 2-(4'-pyridyl)-thiazol-4-ylacetate hydrobromide, M.P. 170°–171° C.

EXAMPLE 3

A mixture of 3-pyridylthioamide (4 g.) and β-bromoethyllevulinate (12.8 g.) in 120 ml. of ethyl alcohol was heated with stirring at 50°–60° C. for 13 hrs. After cooling, the precipitate was removed by filtration and the filtrate was condensed under reduced pressure. The resulting precipitate was recrystallized from ethanol to give 4.0 g. of ethyl 2-(3'-pyridyl)-4-methylthiazol-5-ylacetate hydrobromide, M.P. 184°–185° C.

EXAMPLE 4

A mixture of 3-pyridylthioamide (25 g.) and γ-bromoethyl acetoacetate (77 g.) in 300 ml. of ethanol was heated with stirring at 50°–60° C. for 6 hrs. Afterwards the solvent was evaporated to a residue, to which aqueous sodium carbonate was added. The aqueous solution was extracted with chloroform at pH 11. After the chloroform layer was dried over sodium sulfate, the chloroform removed to an oily residue, which was column-chromatographed on silicate. The portion eluted with benzene was crystallized on treatment with ethanolic hydrochloride to give 17.4 g. of ethyl 2-(3'-pyridyl)-thiazol-4-ylacetate hydrochloric acid, M.P. 138°–139° C.

EXAMPLE 5

A solution of ethyl 2-(3'-pyridyl)-thiazol-4-yl-acetate (10 g.) in 30 ml. of ethanol and 30 ml. of 10% aqueous potassium hydroxide solution was heated at 50° C. for 0.5 hr. After the solvent was removed, the residue was acidified with acetic acid. The resulting precipitate was recrystallized from ethanol to give 5.8 g. of 2-((3'-pyridyl)-thiazol-4-ylacetic acid, M.P. 199°–200° C.

According to the procedure similar to that as mentioned above, there were obtained following compounds.

2-(3'-pyridyl)-4-methyl-thiazol-5-ylacetic acid, M.P. 185°–187° C.

2-(4'-pyridyl)-thiazol-4-ylacetic acid, M.P. 248°–249° C.

2-(4'-pyridyl)-4-methyl-thiazol-5-ylacetic acid, M.P. 221°–223° C.

EXAMPLE 6

A solution of ethyl 2-(3'-pyridyl)-4-methylthiazol-5-ylacetate (0.9 g.) in 10 ml. of ethyl alcohol and 10 ml. of aqueous ammonia solution (28%) was heated with stirring at 60° C. for 2 hrs. After the solvent was evaporated to a solid residue, which was collected by filtration and the solid was recrystallized from ethanol to give 0.5 g. of 2-(3'-pyridyl)-4-methyl-thiazol-5-ylacetamide. M.P. 214°–215° C.

According to the procedure similar to that as mentioned above, there were obtained following compounds.

2-(3'-pyridyl)-thiazol-4-ylacetamide, M.P. 166°–168° C.

2-(4'-pyridyl)-thiazol-4-ylacetamide, M.P. 206°–207° C.

2-(4'-pyridyl)-4-methyl-thiazol-5-ylacetamide, M.P. 263°–266° C.

EXAMPLE 7

A mixture of 3-(o-fluorophenyl)-5-chloroindol-2-yl-thiamide (15.3 g. and γ-bromoethylacetoacetate (20.9 g.) in 300 ml. of ethanol was heated with stirring at 50°–60° C. for 8 hrs. After the solvent was evaporated to a solid residue, which was dissolved in an aqueous sodium carbonate solution and extracted with chloroform at pH 11. The chloroform solution was dried over sodium sulfate and evaporated to a residue, which was recrystallized from ethanol to give 12 g. of 2-[3'-(o-fluorophenyl)-5'-chloroindol - 2' - yl]-thiazol-4-yl-ethylacetate, M.P. 107.5°–108° C.

EXAMPLE 8

A mixture of 3-(o - fluorophenyl)-5-chloroindol-2-yl-thioamide (15.3 g.) and γ-bromoethylacetoacetate (20.9 g.) in 300 ml. ethanol was heated with stirring at 50°–60° C. for 8 hrs. After the solvent was evaporated to a solid residue, which was recrystallized from ethanol to give 15 g. of ethyl 2-[3'-(o-fluorophenyl)-5'-chloroindol-2'-yl]thiazol-4-ylacetate hydrobromide, M.P. 197.5° C. (decomp.).

According to the procedure similar to that as mentioned above, there were obtained following compounds.

Ethyl 2-(3'-phenyl-5'-nitroindol-2'-yl)-4-methylthiazol-5-ylacetate hydrobromide, M.P. 235° C. (decomp.).

Ethyl 2-(3'-phenyl-5'-nitroindol-2'-yl)-thiazol-4-yl-acetate hydrobromide, M.P. 185°–186° C.

Ethyl 2-(1'-methyl-3'-phenyl-5'-chloroindol-2'-yl)-thiazol-4-ylacetate hydrobromide, M.P. 188.5°–190° C.

EXAMPLE 9

A mixture of 3-(o - fluorophenyl)-5-chloroindol-2-yl-thioamide (15.3 g.) and β-bromoethyllevulinate (22.3 g.) in 300 ml. of ethanol was heated at 50°–60° C. for 13 hrs. After the solvent was removed, the residue was dissolved in an aqueous sodium carbonate solution and extracted with chloroform at pH 11. The chloroform solution was dried over sodium sulfate and condensed to an oily residue which was purified by column chromatography of silicate. The portion eluted with benzene was crystallized on treatment with ethanolic hydrochloride to give ethyl 2-[3'-(o-fluorophenyl)-5'-chloroindol-2'-yl]-4-methylthiazol - 5 - ylacetate hydrochloride, M.P. 195°–196° C.

EXAMPLE 10

A solution of ethyl 2-[3'-(o-fluorophenyl)-5'-chloroindol-2'-yl]-4-methylthiazol-5-ylacetate (3.9 g.) in 50 ml. of ethanol and 40 g. of 10% aqueous potassium hydroxide solution was heated at 50° C. for 2 hrs. After cooling, the solution was acidified with acetic acid. The precipitate produced was recrystallized from ethanol to give 2-[3'-(o - fluorophenyl)-5'-chloro - indol-2'-yl]-4-methyl-thiazol-5-yl-acetic acid, M.P. 245°–246° C. (decomp.).

According to the procedure similar to that as mentioned above, there were obtained following compounds.

2-[3'-(o - fluorophenyl)-5'-chloroindol-2'-yl]-thiazol-4-ylacetic acid, M.P. 242° C. (decomp.).

2 - (1'-methyl-3'-phenyl-5'-chloroindol-2'-yl)-thiazol-4-ylacetic acid, M.P. 190°–192° C.

EXAMPLE 11

A mixture of cinnamylthioamide (3.2 g.) and γ-bromoethylacetoacetate (4.2 g.) in 50 ml. of ethanol was stirred at room temperature for 10 hrs. and then heated at 50°–60° C. for 2 hrs. After the solvent was removed, the residue was dissolved in an aqueous sodium carbonate solution and extracted with ether at pH 11. The ether solution was washed with water and dried over sodium sulfate. After the solvent removed, the residue was crystallized on treatment with cyclohexane to give ethyl 2-styryl thiazol-4-ylacetate, M.P. 46°–47° C.

According to the procedure similar to that as mentioned above, there were obtained following compounds.

Ethyl 2-(4' - methoxystyryl)-thiazol-4-ylacetate. (oily substance).

Ethyl 2-(4' - chlorostyryl)-thiazol - 4 - ylacetate, M.P. 105°–106° C.

Ethyl 2-(3',4'-methylendioxy)-thiazol-4-ylacetate, M.P. 90°–91° C.

Ethyl 2-(4'-nitrostyryl)-thiazol-4-ylacetate, M.P. 96°–99° C.

Ethyl 2-(4' - nitrostyryl)-4-methyl-thiazol-5-ylacetate, M.P. 82°–88° C.

Ethyl 2-(4' - isopropylstyryl)-thiazol-4-ylacetate (oily substance).

EXAMPLE 12

A mixture of cinnamylthioamide (8 g.) and β-bromoethyl levulinate (11 g.) in 150 ml. of ethanol was heated with stirring at 50° C. for 5 hrs. After cooling, the precipitate produced was collected by filtration and recrystallized from ethanol to give 11 g. of ethyl 2-styryl-4-methylthiazol-5-ylacetate hydrobromide, M.P. 186° C.

According to the procedure similar to that as mentioned above, there were obtained following compounds.

Ethyl 2-(4'-methoxystyryl)-4-methylthiazol-5-ylacetate hydrobromide, M.P. 201° C.

Ethyl 2-(3',4' - methylendioxystyryl)-4-methyl-thiazol-5-ylacetate hydrobromide, M.P. 206°–207° C.

Ethyl 2-(3',4' - methylenedioxystyryl)-thiazol-4-ylacetate, M.P. 173° C.

Ethyl 2-(4'-chlorostyryl)-thiazol-4-ylacetate hydrobromide, M.P. 187° C.

Ethyl 2-(4' - chlorostyryl)-4-methylthiazol-5-ylacetate hydrobromide, M.P. 201° C.

Ethyl 2-(4'-methylstyryl)-thiazol-4-ylacetate hydrobromide, M.P. 170°–172° C.

Ethyl 2-(4' - methylstyryl)-4-methylthiazol-5-ylacetate hydrobromide, M.P. 192°–194° C.

Ethyl 2-(4' - isopropylstyryl)-4-methylthiazol-5-ylacetate hydrobromide, M.P. 187°–189° C.

EXAMPLE 13

A solution of 2-styrylthiazol-4-yl-ethylacetate (2.5 g.) in 5 ml. of methanol and 20 ml. of aqueous 10% potassium hydroxide solution was stirred at room temperature for 2 hrs. After cooling, the solution was acidified with acetic acid and extracted with chloroform. The chloroform layer was dried over sodium sulfate and the solvent evaporated to give 2-styrylthiazol-4-ylacetic acid, M.P. 130–131° C.

EXAMPLE 14

A solution of 2-styryl-4-methyl-thiazol-5-ylethylacetate hydrobromide (3 g.) in 10 ml. of methanol and 20 ml. of aqueous 10% sodium hydroxide solution was heated at 30°–40° C. for 1 hr. After cooling, the solution was acidified with acetic acid and the precipitate produced was recrystallized from ethanol to give 1.7 g. of 2-styryl-4-methylthiazol-5-ylacetic acid, M.P. 218°–219° C.

According to the procedure similar to that as mentioned above, there were obtained following compounds.

2-(4' - methoxystyryl)-thiazol - 4 - ylacetic acid, M.P. 155°–156° C.

2-(4' - methoxystyryl)-4-methylthiazol-5-ylacetic acid, M.P. 209°–210° C.

2-(3',4' - methylendioxystyryl)-thiazol-4-ylacetic acid, M.P. 170–171° C.

2-(3',4' - methylendioxystyryl)-4-methylthiazol-5-ylacetic acid, M.P. 253° C.

2-(4'-chlorostyryl)thiazol-4-ylacetic acid, M.P. 164° C.

2-(4'-chlorostyryl)-4-methylthiazol - 5 - ylacetic acid, M.P. 229° C.

2-(4'-methylstyryl)-4-methylthiazol - 5 - ylacetic acid, M.P. 236°–237° C.

2-(4'-methylstyryl)-thiazol-4-ylacetic acid, M.P. 249° C.

2-(4'-nitrostyryl)-thiazol-4-ylacetic acid, M.P. >300° C.

2-(4'-nitrostyryl)-methyl - thiazol-5-ylacetic acid, M.P. >300° C.

2-(4'-isopropylstyryl) - thiazol - 4 - ylacetic acid, M.P. 166°–167° C.

2-(4'-isopropylstyryl) - 4 - methylthiazol - 5 - ylacetic acid, M.P. 217°–218° C.

EXAMPLE 15

A solution of 2-styrylthiazol-4-ylethylacetate (2 g.) in 20 ml. of ethanol and 20 ml. of 28% aqueous ammonia solution was refluxed with stirring for 2 hrs. After the solvent was removed, the residue was recrystallized from ethanol to give 2-styrylthiazol-4-yl-acetamide, M.P. 163°–164° C.

EXAMPLE 16

A solution of 2-styryl-4-methyl-thiazol-5-yl-ethylacetate (4 g.) in 30 ml. ethanol and 50 ml. of 28% aqueous ammonia solution was refluxed for 10 hrs. After cooling, the precipitate produced was recrystallized from ethanol to give 2.1 g. of 2-styryl-4-methyl-thiazol-5-yl-acetamide, M.P. 229°–230° C.

EXAMPLE 17

A solution of ethyl 2-(3',4'-methylenedioxystyryl)-thiazol-4-ylacetate hydrobromide (4.2 g.) in 30 ml. of ethanol and 100 ml. of 28% aqueous ammonia solution was refluxed for 15 hrs. After the ethanol was removed, the precipitate produced was recrystallized from ethanol to give 2-(3',4' - methylenedioxystyryl) - thiazol - 4 - yl-acetamide, M.P. 155°–158° C.

According to the procedure similar to that as mentioned above, there were obtained following compounds.

2-(3',4'-methylenedioxystyryl) - 4 - methylthiazol - 5 - yl-acetamide, M.P. 218°–219° C.

2-(4' - methoxystyryl) - thiazol - 4 - ylacetamide, M.P. 158°–159° C.

2-(4'-methoxystyryl) - 4 - methylthiazol - 5 - ylacetamide, M.P. 224°–225° C.

2-(4' - chlorostyryl) - thiazol - 4 - ylacetamide, M.P. 193°–195° C.

2 - (4' - chlorostyryl) - 4 - methylthiazol - 5 - ylacetamide, M.P. 236°–237° C.

2 - (4' - methylstyryl) - thiazol - 4 - ylacetamide, M.P. 178°–181° C.

2 - (4' - methylstyryl) - 4 - methyl - 5 - ylacetamide, M.P. 248°–250° C.

2 - (4' - nitrostyryl) - thiazol - 4 - ylacetamide, M.P. 222°–225° C.

2 - (4' - nitrostyryl) - 4 - methyl - thiazol - 5 -ylacetamide, M.P. 243°–244° C.

2 - (4' - isopropylstyryl) - thiazol - 4 - ylacetamide, M.P. 154°–157° C.

2 - (4' - isopropylstyryl) - 4 - methylthiazol - 5 - ylacetamide, M.P. 140°–142° C.

EXAMPLE 18

A solution of 2-(4'-chlorostyryl)-thiazol - 4 - yl - ethylacetate hydrobromide (3 g.) in 20 ml. of ethanol and 10 ml. of hydrazine hydrate was heated at 60° C. for 10 hrs. After the ethanol was removed, the precipitate produced was recrystallized from ethanol to give 2 - (4' - chlorostyryl)-thiazol-4-yl-acetic acid hydrazide, M.P. 188°–190° C.

According to the procedure similar to that as mentioned above, there were obtained following compounds.

2 - (4' - isopropylstyryl) - thiazol - 4 - yl - acetic acid hydrazide, M.P. 160°–162° C.

2 - (4' - isopropylstyryl) - 4 - methyl - thiazol - 5 - yl-acetic acid hydrazide, M.P. 140°–142° C.

2 - (4' - chlorostyryl) - 4 - methyl - thiazol - 5 - yl-acetic acid hydrazide, M.P. 199°–201° C.

What we claim is:

1. A thiazolylacetic acid derivative of the formula

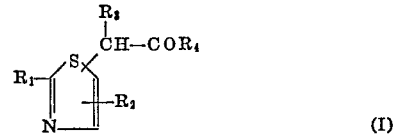

(I)

wherein $R_1$ is pyridyl, indolyl which may be unsubstituted or substituted with not more than two members selected from the group consisting of halogen, $C^1$–$C^5$ alkoxy, $C^1$–$C^5$ alkyl, phenyl and halophenyl, styryl which may be unsubstituted or substituted in the benzene ring with not more than two members selected from the group consisting of halogen, nitro, methylenedioxy, $C^1$–$C^5$ alkyl and $C^1$–$C^5$ alkoxy; $R_2$ is hydrogen, $C^1$–$C^5$ alkyl or unsubstituted or substituted phenyl; $R_3$ is hydrogen or $C^1$–$C^5$ alkyl; and $R_4$ is hydroxyl, $C^1$–$C^5$ alkoxy, amino or hydrazino; and salts thereof.

2. A thiazolylacetic acid derivative of the formula,

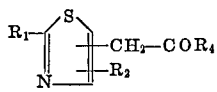

wherein $R_1$ is styryl, p-chlorostyryl, p-methylstyryl or p-methoxystyryl; $R_2$ is hydrogen or methyl; $R_4$ is hydroxyl, ethoxy, amino or hydrazino.

3. Ethyl 2-styryl thiazol-4-ylacetate.

References Cited

UNITED STATES PATENTS 2,423,709    7/1947    Knott _____ 260—298

(Other references on following page)

FOREIGN PATENTS 1,137,529  12/1968  Great Britain ___ 260—306.8 R

OTHER REFERENCES

Netherlands published application No. 6715532 published May 20, 1968, 51 pp. and two pp. dwgs.
Netherlands published application No. 6905474 published Oct. 13, 1969, 17 pp. and 1 dwg.

Elderfield, Heterocyclic Compounds, vol. 5, pp. 626 to 627, John Wiley and Sons, N.Y. (1957).

JOHN D. RANDOLPH, Primary Examiner

U.S. Cl. X.R.

424—263, 270; 260—240.1, 240.9, 294.8 D, 306.8 R

UNITED STATES PATENT OFFICE
CERTIFICATE OF CORRECTION

Patent No. 3,705,153    Dated December 5, 1972

Inventor(s) Shin-Ichi KANEKO et al

It is certified that error appears in the above-identified patent and that said Letters Patent are hereby corrected as shown below:

Claim 1, delete the word "pyridyl" from the definition of $R_1$.

Signed and sealed this 19th day of March 1974.

(SEAL)
Attest:

EDWARD M. FLETCHER, JR.
Attesting Officer

C. MARSHALL DANN
Commissioner of Patents